United States Patent [19]
Turner et al.

[11] 3,952,511
[45] Apr. 27, 1976

[54] HYDROSTATIC DRIVE CIRCUIT

[75] Inventors: Robert M. Turner, Great Bend; Herbert Z. Langland, Topeka, both of Kans.

[73] Assignee: Allis-Chalmers Corporation, Milwaukee, Wis.

[22] Filed: Dec. 30, 1974

[21] Appl. No.: 537,609

[52] U.S. Cl. ................................. 60/430; 60/484; 60/486; 180/44 F; 60/464
[51] Int. Cl.² ........................................ F15B 18/00
[58] Field of Search ............ 60/422, 426, 427, 430, 60/464, 484, 486; 180/44 F

[56] References Cited
UNITED STATES PATENTS

| | | | |
|---|---|---|---|
| 3,092,970 | 6/1963 | Sampietro | 60/484 X |
| 3,261,421 | 7/1966 | Forster et al. | 60/486 X |
| 3,641,765 | 2/1972 | Hancock et al. | 180/44 F |

*Primary Examiner*—Edgar W. Geoghegan
*Attorney, Agent, or Firm*—Arthur L. Nelson

[57] ABSTRACT

A hydrostatic vehicle drive system having a closed loop front wheel drive circuit and a closed loop rear wheel drive circuit with bi-directional pressure compensating crossover flow between the two closed loop circuits. Another hydrostatic circuit for driving auxiliary equipment also operates as a source of pressurized fluid for charging the wheel drive circuits. The auxiliary hydrostatic circuit includes priority flow to the auxiliary equipment and a flow control with pressure relief means to maintain a constant charging pressure and a predetermined fluid flow for operating the braking circuit as well as charging the wheel drive circuits.

10 Claims, 2 Drawing Figures

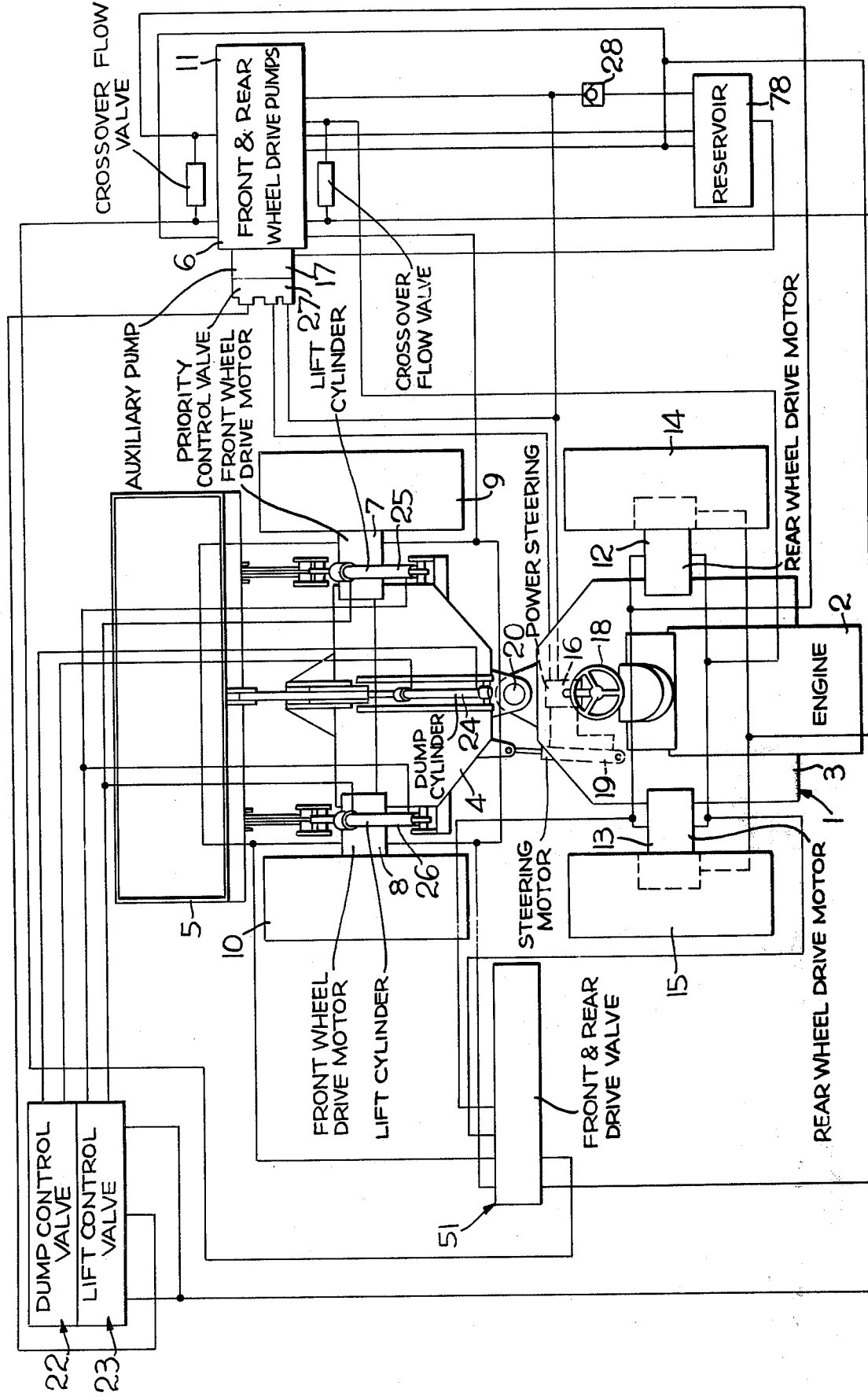

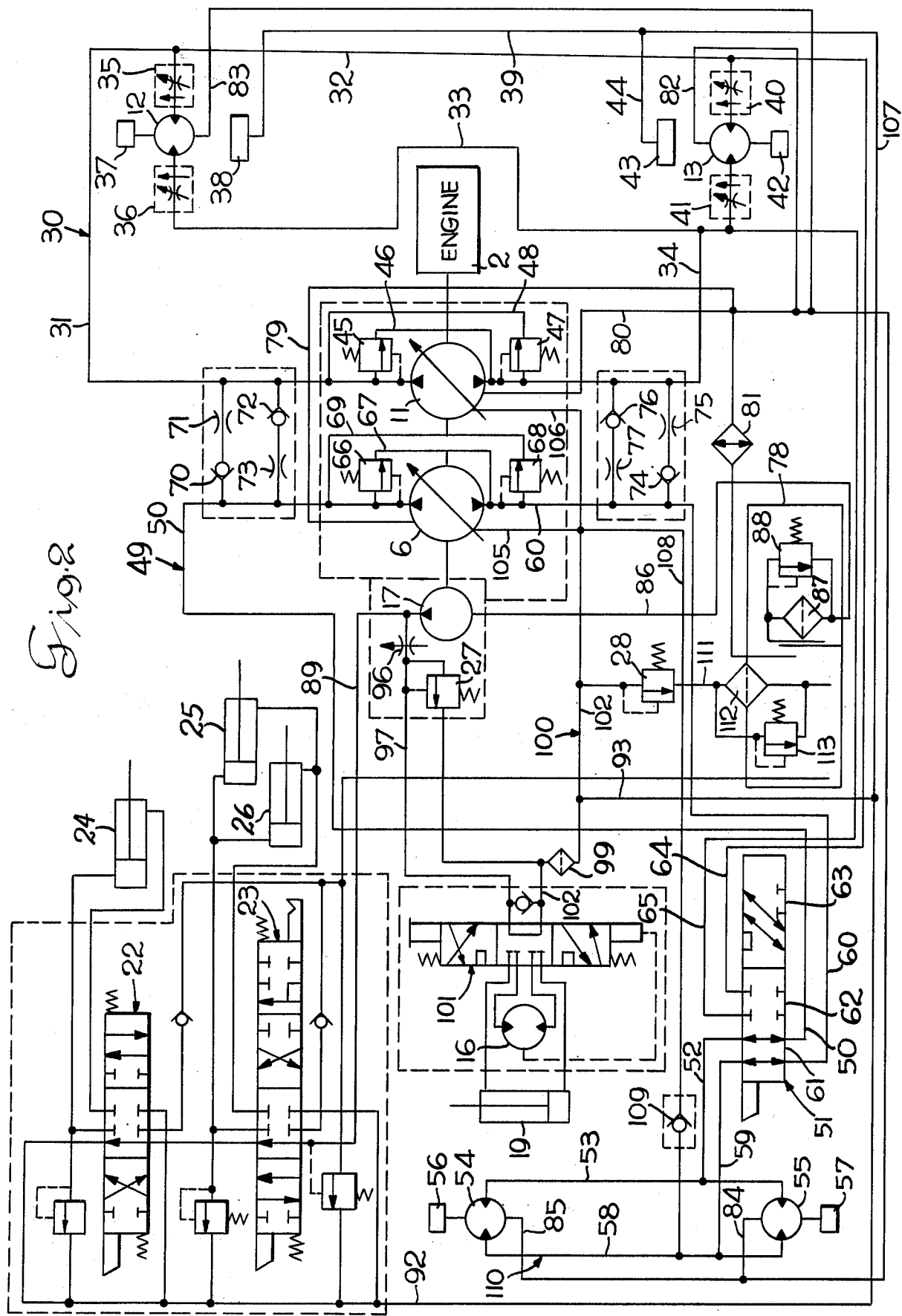

HYDROSTATIC DRIVE CIRCUIT

This invention relates to a hydrostatic vehicle drive system and more particularly to a hydrostatic vehicle drive system with a closed loop front wheel drive circuit and a closed loop rear wheel drive circuit and bi-directional pressure compensated crossover flow between two circuits. Another hydrostatic circuit for driving auxiliary equipment provides pressurized fluid for charging the drive circuits to avoid cavitation of the drive circuit motors and pumps.

Although hydrostatic transmissions have been used in vehicles, there are certain inherent problems which must be overcome as the power transmission in this type of a system is increased. The components of the system such as pumps and hydraulic lines have been improved to the point where the hydraulic system of power transmission has some real advantages over the mechanical systems which have been used quite extensively in the past. When the hydraulic systems are used to maximum capacity the heating of the hydraulic fluid in the system can present a problem. Also, the cleanliness of the system to a certain degree is a measure of the component life. This is particularly true where the pumps used are the piston type and close tolerances are used between the moving parts. The abrasiveness of some of the impurities can be detrimental and severely limit the life of the pistons and cylinder of the pump.

Cavitation of the pumps and the motors can also present a real problem in a hydrostatic drive system. Cavitation in the pumps and motors is very damaging to these components and can destroy them in a relatively short period of time. Accordingly, it is necessary that an adequate supply of hydraulic fluid be present in the motors and pumps when they are in operation to assure reliability and component life of the system.

Accordingly, this invention provides for a wheel drive propulsion system using a combination of external charging oil supply with an independent in-line relief valve in conjunction with a modified closed loop through bi-directional pressure compensated crossover flow controls between the drive circuits. The charging circuit supplies adequate hydraulic fluid to the drive system under all operating conditions and also provides overflow from the one closed loop to the other closed loop to improve cooling conditions of either of the hydraulic systems. This is particularly advantageous when either of the closed loop drive circuits are operating at maximum capacity.

It is an object of this invention to provide a separate charging circuit for operating auxiliary equipment and for charging the hydrostatic transmission circuits and avoid cavitation of either of the drive circuits under all operating conditions.

It is another object of this invention to provide a hydrostatic vehicle drive system having a front closed loop drive circuit and a rear wheel closed loop drive circuit with auxiliary circuit providing external charging means for supplying the closed loop vehicle drive system.

It is a further object of this invention to provide a hydrostatic vehicle drive system having front and rear wheel drive circuits with crossover flow between the circuits to maintain constant drive on all wheels and an auxiliary circuit for operating auxiliary equipment providing external charging of the front and rear wheel drive circuits.

The objects of this invention are accomplished by providing two propulsion pumps which are reversible, variable volume piston pumps and are engine driven. The rear wheel drive variable volume pump is connected in a closed loop rear wheel drive circuit to two drive motors connected in parallel. A pressure responsive flow control valve is positioned on each side of the motors which are reversible to protect the rear wheel motors when operating in the high speed range. The front wheel drive pump is a reversible, variable volume pump which drives the front wheel motors or selectively drives the rear wheel motors. A suitable control valve is provided to selectively operate the closed loop front wheel drive circuit separately from the rear wheel closed loop drive circuit or to connect both the front wheel pump and the rear wheel pump in parallel for driving the rear wheel motors only and thereby drive the vehicle in a high speed range. A pressure compensated flow control on the rear wheel drive motors assure safety of operation regardless of the hydraulic fluid pumps operating the rear wheel motors. A third pump is provided in the system which operates through a priority flow divider which controls the operation of auxiliary equipment. The priority flow control supplies priority of flow to the steering valve for controlling a steering mechanism. The charging circuit is also used as a source of pressurized fluid for operating vehicle brakes. A pressure relief valve in the priority flow control diverts a portion of the pressurized fluid through a filter and forms a charging circuit at a constant pressure as maintained by a relief valve. The charging circuit is connected to the variable volume wheel drive pumps. Although the wheel drive pumps operate in closed circuits, the charging circuit maintains adequate supply of hydraulic fluid for the vehicle drive pumps at all times. The two closed loop wheel drive circuits are interconnected by means of bi-directional pressure compensated flow control valves between their respective outputs and returns. The crossover flow between the front and rear closed loop circuits assures constant traction of all drive wheels. The crossover feature allows a greater volume of oil to circulate through the circuit than with one drive pump since a portion of the fluid can be diverted through a portion of the other circuit and thereby provide an additional cooling effect on the hydraulic fluid. It may also be transmitted through coolers in the circuits to lower the temperatures.

The crossover flow from the one closed loop drive circuit to the other closed loop drive circuit permits additional fluid to be circulated through the system and thereby adding cooler fluid to the other system. This type of operation allows the pump to operate at relief pressure at a much longer period of time without serious temperature problem. The crossover flow also permits a pressure balanced modified closed loop in the front and rear circuits at starting torque pressures for unequal load distribution.

The preferred embodiment of this invention is illustrated in the attached drawings.

FIG. 1 illustrates a hydraulic circuit diagram of the hydrostatic vehicle drive system.

FIG. 2 illustrates a hydraulic circuit of the hydrostatic vehicle drive system and the implement and charging circuit for charging the front and rear wheel drive closed loop circuits with a crossover flow between the closed loop front and rear wheel drive circuits.

Referring to the drawings, FIG. 1 illustrates a circuit diagram of the hydrostatic vehicle drive transmission. The vehicle 1 is driven by the engine 2 on the rear section 3. The front section 4 carries a bucket 5 which is lifted and tilted in response to the auxiliary hydraulic system. The front wheel drive pump 6 drives the front wheel drive motors 7 and 8 which in turn drive the front wheels 9 and 10.

The rear wheel drive pump 11 drives the rear wheel drive motors 12 and 13 which in turn drive the rear wheels 14 and 15, respectively. Power steering valve and motor 16 are driven by an auxiliary pump 17 in response to operation of the steering wheel 18. The hydraulic steering valve and motor 16 are connected to the hydraulic steering cylinder 19 which steers the vehicle by articulation of the vehicle through the articulating bearing 20.

The front wheel drive pump 6 drives the front wheel motors 7 and 8; however, the front and rear wheel drive valve 51 is connected in the circuit and can be selectively operated to selectively drive the front wheel drive motors 7 and 8 or to drive into the rear wheel drive circuit and augment driving of the rear wheel drive motors 12 and 13 and double the drive speed of the vehicle by supplying all the hydraulic fluid from both the front wheel drive pump 6 and rear wheel drive pump 11.

The auxiliary pump 17 also supplies pressurized hydraulic fluid to the dump control valve 22 and the lift control valve 23. The dump control valve 22 operates the dump hydraulic cylinder 24 to dump the bucket 5 in response to manual control. The lift control valve 23 controls the flow of pressurized fluid to the lift cylinders 25 and 26 to lift the bucket 5.

The auxiliary hydraulic pump 17 also operates as a source of pressurized fluid for the charging circuit for charging the hydraulic drive pumps 6 and 11. The priority flow divider 27 supplies hydraulic fluid to the hydraulic steering valve and motor 16 and supplies pressurized fluid to the charging circuit to charge the pumps 6 and 11. The relief valve 28 returns fluid to the reservoir 78 and backs up pressure to maintain a constant charging pressure for charging the pumps 6 and 11.

Referring to FIG. 2, the hydraulic system is illustrated. The engine 2 drives the reversible, variable volume front wheel hydraulic drive pump 6 and the reversible variable volume hydraulic rear wheel drive pump 11 as well as the auxiliary pump 17. The rear wheel drive pump 11 is part of the rear wheel closed loop drive circuit 30. A conduit 31 is connected to the rear wheel drive pump 11. For the purpose of illustration, it will be assumed that the rear wheel drive pump 11 is discharging high pressure fluid into the conduit 31. The conduit 31 is connected to conduit 32 which connects to the input sides of the rear wheel drive motors 12 and 13. For the purpose of illustration, the discharge of the motors 12 and 13 are connected to conduit 33 which returns hydraulic fluid through conduit 33 to the low pressure side of the variable volume rear wheel drive pump 11 through conduit 34. A pressure compensated flow control valve 35 is connected between the conduit 31 and the motor 12. A pressure compensated flow control valve 36 is positioned between the motor 12 and the conduit 33. The rear wheel drive motor 12 drives the wheel 37. The brake 38 releases the rear wheel 37 when fluid is pressurized in the conduit 39.

A pressure compensated flow control valve 40 is positioned between the conduit 32 and the motor 13. Similarly, a pressure compensated flow control valve 41 is positioned between the motor 13 and conduit 33. The rear wheel drive motor 13 drives the rear wheel 42. The brake 43 releases the rear wheel 42 when hydraulic fluid is pressurized in the conduit 44.

For the purpose of illustration, the variable volume rear wheel drive pump 11 discharges fluid in conduit 31. The pressure relief valve 45 relieves the pressure in conduit 31 when the pressure in conduit 31 rises to a predetermined value and discharges fluid into the conduit 46 to return to the low pressure side of the pump 11. Similarly, when the variable volume rear wheel drive pump 11 is operating in the opposite direction, a relief valve 47 discharges fluid in the conduit 48 when the pressure rises to a predetermined value in conduit 34.

It is noted that the rear wheel drive circuit 30 is a closed loop circuit. To prevent cavitation in the circuit, such as the pump 11 and the motors 12 and 13, an external charging circuit is provided which will subsequently be described.

The reversible, variable volume front wheel drive pump 6 operates within the front wheel drive circuit 49 which forms a closed loop. For the purpose of illustration, the front wheel drive pump discharges into the conduit 50. The conduit 50 is connected to the front and rear wheel control valve 51. The conduit 50 discharges fluid into the valve 51 which flows through the valve into conduit 52 when the valve is in the position as shown. Conduit 52 is connected to conduit 53 which supplies pressurized fluid to the front wheel drive motors 54 and 55. The front wheel drive motor 54 drives the front wheel 56 while the front wheel drive motor 55 drives the front wheel 57. The front wheel drive motors 54 and 55 discharge fluid into conduit 58. Conduit 58 is connected to the conduit 59 which in turn is connected to the conduit 60 through the front and rear wheel control valve 51. The conduit 60 is connected to the return side of the variable volume front wheel drive pump 6.

The front and rear wheel control valve 51 includes a front valve section 61 for connecting the reversible front wheel variable drive pump 6 to drive the front wheel motors 54 and 55. The front and rear wheel control valve 51 also includes a neutral section 62 in which fluid is not transmitted from the front wheel drive pump 6 to either the front or rear wheels. The front and rear wheel control valve 51 also has a rear wheel drive section 63. In this position the hydraulic fluid from the front wheel drive pump 6 is transmitted through the valve whereby the conduit 50 is connected to the conduit 64 which is connected to conduit 32 in the rear wheel drive circuit 30. Conduit 60 is connected to conduit 65 which in turn is connected to conduit 33 in the rear wheel drive circuit 30. When the front and rear wheel control valve 51 connects the variable volume front wheel drive pump 6 to the rear wheel drive circuit 30, essentially twice the volume of hydraulic fluid is transmitted to the rear wheel motors 12 and 13 as when they were supplied by only pump 11 and accordingly the rear wheels are driven at twice their normal speed.

The variable volume front wheel drive pump 6 is provided with a relief valve 66 which bypasses pressurized hydraulic fluid into conduit 67 to the low pressure side of the variable volume front wheel drive pump 6 and returns the fluid to the low pressure side of the pump in conduit 60. When the front wheel drive pump 6 is operated in the reverse direction, likewise the relief valve 68 bypasses pressurized hydraulic fluid when the pressure from the discharge side of the pump 6 reaches a predetermined value to thereby permit the flow of fluid through the bypass valve 68 through the conduit 69 to the low pressure side of the pump 6.

Bi-directional pressure compensated crossover flow is provided between the rear wheel drive circuit 30 and the front wheel drive circuit 49. The check valve 70 permits the flow of pressurized fluid from the conduit 50 through the orifice 71 to conduit 31 when the pressure in the conduit 50 is a predetermined value above the pressure in the conduit 31.

Similarly when the pressure in the conduit 31 of the rear wheel drive circuit 30 is a predetermined amount of pressure higher than the pressure in the conduit 50 of the front wheel drive circuit 49, the check valve 72 permits the flow of pressurized fluid from conduit 31 through the orifice 73.

Similarly, when the rear wheel drive pump 11 and the front wheel drive pump 6 are driving in the opposite direction, and the pressurized fluid in the conduit 60 reaches a predetermined differential value above the pressure in conduit 34 of the rear wheel drive circuit 30; the pressurized fluid will flow through the check valve 74 and the orifice 75 to conduit 34. If the pressure in the conduit 34 is a predetermined differential value above the pressure in the conduit 60, the pressurized fluid will flow from the conduit 34 in the rear wheel drive circuit 30 through the check valve 76 and orifice 77 to the conduit 60.

The reservoir 78 provides a reserve supply of hydraulic fluid. A drain passage 79 from the front wheel drive pump 6 and a drain passage 80 from the rear wheel drive pump 11 drains through the cooler 81 to cool the fluid as it is returned to the reservoir 78. Similarly, drain passages 82 and 83 return hydraulic fluid through the cooler 81 to the reservoir 78. Drain passages 84 and 85 drain hydraulic fluid from the front wheel drive motors 55 and 54 to the cooler 81 and to the reservoir 78.

The auxiliary pump 17 receives hydraulic fluid through conduit 86 which is connected through the filter 87 and the bypass valve 88 to the fluid reservoir 78. The auxiliary pump 17 pressurizes fluid in conduit 89 which is supplied to the lift control valve 23 and the dump control valve 22. The operation of the lift and dump valves 23, 22, respectively, control the operation of the bucket 5. The return line conduit 92 returns fluid from the lift and dump valves 23 and 22 to the reservoir 78 through conduit 93 and relief valve 28.

The auxiliary pump 17 also provides pressurized fluid to the priority control valve 27. The priority control valve includes a variable orifice 96 in the conduit 97. The bypass valve 27 bypasses pressurized fluid from the conduit 97 to the filter 99 to the charging circuit 100. The fluid in conduit 97 is transmitted through to the steering control valve 101. The steering control valve is operated by the steering wheel 18 which operates the steering valve and motor 16 to selectively drive the steering cylinder 19 for steering of the vehicle. Hydraulic fluid returned from the steering valve and motor 16 and hydraulic cylinder 19 is returned through the return conduit 102 and filter 99 to the charging circuit 100.

The charging circuit 100 essentially consists of the variable orifice 96 and the valve 27 which direct hydraulic fluid to the conduit 102. The valve 27 maintains essentially a constant pressure in the charging circuit 100. The charging circuit 100 is connected to the conduits 105 and 106 which are connected to the front hydraulic drive pump 6 and the rear wheel hydraulic drive pump 11 and supply pressurized fluid to these two pumps to assure that there is no cavitation in the pumps and the closed loop circuits 49 and 30 are adequately supplied with hydraulic fluid.

The charging circuit 100 is connected through the conduit 93 to the conduit 107 which is connected to conduits 39 and 44 for actuation of the vehicle brakes 38 and 43.

The charging circuit 100 is also connected to conduit 108 through check valve 109 to supply pressurized fluid to the front wheel circuit 110 when the front wheel motors and when the front and rear wheel drive pumps are driving the rear wheels. The relief valve 28 returns hydraulic fluid through the return conduit 111 and filter 112 to the reservoir 78. The bypass valve 113 bypasses the filter 112 to return hydraulic fluid to the reservoir 78.

The operation of the hydrostatic drive system will be described in the following paragraphs.

The reversible variable volume rear drive pump 11 and the reversible variable volume front drive pump 6 as well as the auxiliary pump 17 are driven by the engine 2. The rear drive pump 11 drives through a closed loop rear drive circuit 30. For the purpose of illustration it will be assumed the pump is driving in the direction to pressurize hydraulic fluid in conduit 31. The rear drive motors 12 and 13 are connected in parallel in the closed loop rear drive circuit 30. The speed of the motors is dependent upon the rate of displacement of the variable volume rear drive pump 11.

The reversible variable volume front wheel drive pump 6 also operates within a closed loop front wheel drive circuit 49. Normally the front wheels are driven by the fixed displacement motors 54 and 55 connected in parallel in the front wheel drive loop 49. When the front wheels and the rear wheels are being driven pressurized fluid is supplied to the drive motors. If an increased torque demand is required by the rear wheels as compared to the front wheels, a greater pressure is developed in the rear drive wheel circuit 30. This increases the pressure in the rear wheel drive circuit 30 and pressurized fluid in conduit 31 builds up and a differential pressure above a predetermined value is applied across the check valve 72. This causes the flow of pressurized fluid through the check valve into conduit 50 in the front wheel drive circuit 49. The orifice 73, however, limits the flow of fluid through the check valve 72 to approximately four gallons per minute.

The drive on the rear wheel drive motors 12 and 13 is transmitted equally to each motor since the pressure applied to each motor is equal. Any slippage on one of the drive motors does not release the other motor from applying torque to its mating wheel. Accordingly, when the rear hydraulic system is operating near relief pressure on the relief valve 45, a certain amount of fluid is transmitted through the front wheel drive circuit 49 and is returned on the low pressure side through the check valve 74 and orifice 75 to conduit 34. The shunting of fluid through the front wheel drive circuit permits cooling of this fluid. There may be a greater heating of the hydraulic fluid in the rear wheel drive circuit 30 operating at relief valve pressure. The reverse situation may be true wherein the front wheel drive circuit 49 is developing greater torque on the front wheels and the reverse flow of fluid may be encountered whereby the pressurized fluid flows through the check valve 70 and orifice 71 from the conduit 50 to conduit 31. The return of the fluid from the rear wheel drive circuit 30 is through the check valve 76 and orifice 77 from conduits 33 and 34 to conduit 60.

When it is desired to drive the vehicle in the high speed range the front and rear wheel control valve 51 is shifted to the left-hand position whereby the conduits 50 and 60 are connected to the conduits 64 and 65, respectively. This connects the output of the front wheel drive pump 6 to the rear wheel drive circuit 30 and essentially twice the amount of fluid is supplied to the rear wheel drive circuit, however, maximum flow of pressurized fluid is limited to a predetermined amount through the motors 12 and 13 to avoid damage to the motors. The limitation of fluid flow is through the pressure responsive flow control valves 35 and 40, however, this is adequate to allow essentially twice the speed of rotation of motors 12 and 13 as would normally be permitted by the normal driving from the rear wheel drive circuit.

The implement pump 17 receives fluid from the reservoir 78 through the filter 87 and conduit 86. Pressurized fluid from the implement pump 17 is discharged in the conduit 89 and is supplied to the lift control valve 23 and the dump control valve 22 for operating auxiliary equipment. Similarly pressurized fluid in the conduit 89 is supplied to the priority flow valve 27. Pressurized fluid flowing through the variable orifice 96 is supplied to the steering control valve 101 and a steering control valve and motor 16 as well as the steering hydraulic actuator 19. Selective positioning of the steering control valve 101 provides pressurized fluid for steering the vehicle.

Pressurized fluid from the conduit 97 is also bypassed through the valve 27 through the filter 99 to the charging circuit 100. The charging circuit 100 supplies pressurized fluid at approximately 200 psi which is maintained by the relief valve 28 which returns fluid through conduit 111 and filter 112 and bypass valve 113 to the reservoir 78. Pressurized fluid in the fluid charging circuit 100 is supplied to the conduits 105 and 106 to the inlet side of the front wheel drive pump 6 and the rear wheel drive pump 11. This assures adequate supply of pressurized fluid to the pumps 6 and 11 and the motors 12 and 13 in the rear wheel drive circuit 30. The fluid is also supplied to the front wheel motors 54 and 55 as well.

When the front and rear control valve 51 is in the neutral position, conduit 108 is connected through the check valve 109 to the conduit 58 in the circuit 110. This supplies adequate fluid to the front wheel motors 54 and 55 to avoid cavitation in the circuit when the front wheels are rotating without being supplied with pressurized fluid from the front wheel drive pump 6.

The embodiments of the invention in which an exclusive property or privilege is claimed are defined as follows:

1. A hydrostatic vehicle drive system comprising, a rear wheel drive circuit including a reversible variable volume rear wheel drive pump, a pair of reversible rear wheel drive motors, fluid flow control valve means for controlling the maximum rate of flow through said rear wheel drive motors, a front wheel drive circuit including a reversible, variable volume front wheel drive pump, a pair of reversible front wheel drive motors, a control valve for selectively and alternatively connecting said front wheel drive pump to drive said front wheel drive motors and said rear wheel drive motors, bi-directional pressure compensating flow control valves connected between said rear wheel drive circuit and said front wheel drive circuit, a reservoir, a fixed volume pump connected to said reservoir, at least one hydraulic actuator for controlling operation of auxiliary equipment, auxiliary equipment control valve means connected between said fixed volume pump and said hydraulic actuators, a hydraulic actuator for operating a steering mechanism, a priority flow control divider for supplying hydraulic fluid to said steering hydraulic actuator, a pump charging circuit connected to said priority flow control divider including a pressure relief valve for connecting said charging circuit to said reservoir for maintaining a predetermined pressure in said charging circuit, means connecting said fluid charging circuit to the inlet of said variable volume pumps, to thereby assure satisfactory charging of fluid to said variable volume drive pumps and said drive wheel motors.

2. A hydrostatic vehicle drive system as set forth in claim 1 wherein said flow control divider includes a variable orifice means, a pressure responsive bypass valve bypassing pressurized fluid to said fluid charging circuit, or supplying fluid to said charging circuit and maintaining a pressure in said charging circuit in response to the pressure of said relief valve discharging fluid to said reservoir.

3. A hydrostatic vehicle drive system as set forth in claim 1 including a relief valve and conduit means connected between the inlet and the outlet side of each of said variable volume wheel drive pumps for bypassing pressurized hydraulic fluid when the pressure from the outlet side of said pump rises above a predetermined value.

4. A hydrostatic vehicle drive system as set forth in claim 1 including a filter, a relief valve bypassing said filter and connected in series with said relief valve connected between said charging circuit and said reservoir.

5. A hydrostatic vehicle drive system as set forth in claim 1 including a filter connected between said priority flow divider and said relief valve connected to said reservoir.

6. A hydrostatic vehicle drive system as set forth in claim 1 including a drain circuit connected to said pumps and motors, a cooler connected between the drain circuit and said reservoir to cool hydraulic fluid returned to said reservoir.

7. A hydrostatic vehicle drive system as set forth in claim 1 including, conduit means connected between said charging circuit and said front wheel drive motors, a check valve connected in said conduit means connected between said charging circuit and said front wheel drive motors permitting unidirectional flow of hydraulic fluid from said charging circuit to said front wheel drive motors when the pressure in said charging circuit is a predetermined value above the pressure in said front wheel motors.

8. A hydrostatic vehicle drive system as set forth in claim 1 wherein said flow control valves connected to the inlets of said rear wheel drive motors include pressure responsive means for controlling the passage opening to said rear wheel drive motors to limit the peak fluid flow through said rear wheel drive motors.

9. A hydrostatic vehicle drive system as set forth in claim 1 including conduit means connecting said steering circuit with said charging circuit to permit flow of pressurized fluid from said steering circuit to said charging circuit for return flow of hydraulic fluid from said steering circuit.

10. A hydrostatic vehicle drive system as set forth in claim 1 including braking means including hydraulic actuators, conduit means connecting said charging circuit to said hydraulic actuators of said vehicle braking means.

* * * * *